US010387897B2

(12) United States Patent
Sakata et al.

(10) Patent No.: US 10,387,897 B2
(45) Date of Patent: Aug. 20, 2019

(54) RETAIL SALES OPPORTUNITY LOSS CAUSE ANALYSIS BASED ON IMAGE ANALYSIS OF SHELF DISPLAY

(71) Applicant: PANASONIC INTELLECTUAL PROPERTY MANAGEMENT CO., LTD., Osaka (JP)

(72) Inventors: Yoshifumi Sakata, Tokyo (JP); Kazuhiko Iwai, Kanagawa (JP); Yuichiro Takemoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 15/515,741

(22) PCT Filed: Oct. 23, 2015

(86) PCT No.: PCT/JP2015/005334
§ 371 (c)(1),
(2) Date: Mar. 30, 2017

(87) PCT Pub. No.: WO2016/072056
PCT Pub. Date: May 12, 2016

(65) Prior Publication Data
US 2017/0300938 A1    Oct. 19, 2017

(30) Foreign Application Priority Data
Nov. 5, 2014    (JP) .................................. 2014-224826

(51) Int. Cl.
*G06Q 30/06* (2012.01)
*G06Q 50/10* (2012.01)
(Continued)

(52) U.S. Cl.
CPC ..... *G06Q 30/0201* (2013.01); *G06K 9/00671* (2013.01); *G06K 9/00771* (2013.01);
(Continued)

(58) Field of Classification Search
CPC ............... G06Q 10/087; G06Q 20/203; G06Q 30/0643; G06K 9/78
See application file for complete search history.

(56) References Cited

U.S. PATENT DOCUMENTS 5,138,638 A * 8/1992 Frey ........................ G06Q 10/06
377/6
7,944,358 B2 * 5/2011 Sorensen .................. G07C 9/00
340/539.13
(Continued)

FOREIGN PATENT DOCUMENTS

| JP | 5-81552 | 4/1993 |
|---|---|---|
| JP | 5072985 | 11/2012 |
| JP | 2013-210953 | 10/2013 |

OTHER PUBLICATIONS

Traxretail.com—Trax image recognition product web pages Traxretail.com, Sep. 27, 2015, Retrieved from Archive.org Jan. 4, 2018 (Year: 2015).*
(Continued)

*Primary Examiner* — Scott L Jarrett
(74) *Attorney, Agent, or Firm* — Greenblum & Bernstein, P.L.C.

(57) ABSTRACT

A commodity monitoring device includes a visitor number acquirer that acquires the number of visitors, a purchasing customer number acquirer that acquires the number of purchasing customers who purchase a commodity, a statistical information generator that generates statistical information, based on the number of visitors and the number of purchasing customers, a commodity detector that detects commodity, based on a captured image of a display area, a
(Continued)

sales opportunity loss analyzer that analyzes a cause of the sales opportunity loss from a commodity detection result, and a display screen generator that generates a monitoring screen in which a display image representing the cause of the sales opportunity loss is superimposed on the image of the display area.

14 Claims, 9 Drawing Sheets

(51) Int. Cl.
| | |
|---|---|
| G06K 9/00 | (2006.01) |
| G06K 9/62 | (2006.01) |
| G06Q 20/20 | (2012.01) |
| G06Q 10/08 | (2012.01) |
| G06Q 30/02 | (2012.01) |
| G07G 1/12 | (2006.01) |
| G07G 1/14 | (2006.01) |
| G06K 9/78 | (2006.01) |
| H04N 5/445 | (2011.01) |
| H04N 7/18 | (2006.01) |

(52) U.S. Cl.
CPC .......... *G06K 9/6201* (2013.01); *G06K 9/78* (2013.01); *G06Q 10/087* (2013.01); *G06Q 20/20* (2013.01); *G06Q 20/203* (2013.01); *G06Q 30/06* (2013.01); *G06Q 50/10* (2013.01); *G07G 1/12* (2013.01); *G07G 1/14* (2013.01); *H04N 5/44504* (2013.01); *G06K 2209/17* (2013.01); *H04N 7/181* (2013.01)

(56) References Cited

U.S. PATENT DOCUMENTS

| | | | | |
|---|---|---|---|---|
| 8,189,855 B2* | 5/2012 | Opalach | G06Q 10/087 | 382/100 |
| 8,321,303 B1* | 11/2012 | Krishnamurthy | | 705/28 |
| 2001/0049690 A1* | 12/2001 | McConnell | G06Q 10/087 | |
| 2002/0138336 A1* | 9/2002 | Bakes | G06Q 10/087 | 705/28 |
| 2003/0208468 A1* | 11/2003 | McNab | G06Q 10/10 | |
| 2005/0190072 A1* | 9/2005 | Brown | G06Q 10/087 | 340/6.1 |
| 2007/0061210 A1* | 3/2007 | Chen | G06Q 10/087 | 705/22 |
| 2008/0077511 A1* | 3/2008 | Zimmerman | G06Q 10/00 | 705/28 |
| 2008/0147475 A1* | 6/2008 | Gruttadauria | G06Q 10/087 | 705/7.31 |
| 2008/0306787 A1* | 12/2008 | Hamilton | G06Q 10/06 | 705/7.38 |
| 2009/0024450 A1* | 1/2009 | Chen | G06O 30/02 | 705/7.31 |
| 2010/0138281 A1* | 6/2010 | Zhang | G06Q 10/087 | 705/28 |
| 2011/0194843 A1 | 8/2011 | Harada | | |
| 2012/0173304 A1* | 7/2012 | Hosoda | G06Q 10/087 | 705/7.31 |
| 2013/0262179 A1 | 10/2013 | Harada | | |
| 2014/0019201 A1* | 1/2014 | Appel | G06Q 30/00 | 705/7.29 |
| 2014/0032379 A1* | 1/2014 | Schuetz | G06Q 10/087 | 705/28 |
| 2014/0039951 A1* | 2/2014 | Appel | G06Q 30/02 | 705/7.11 |
| 2014/0115602 A1* | 4/2014 | Colligan | G06F 9/5027 | 718/105 |
| 2014/0278655 A1* | 9/2014 | Sorensen | G06Q 10/063118 | 705/7.17 |
| 2015/0120392 A1* | 4/2015 | Gharachorloo | G06Q 10/0639 | 705/7.34 |
| 2015/0220790 A1* | 8/2015 | Gold | G06K 9/00664 | 382/103 |
| 2015/0235157 A1* | 8/2015 | Avegliano | G06Q 10/06315 | 705/7.25 |
| 2015/0262116 A1* | 9/2015 | Katircioglu | G06Q 10/087 | 705/28 |
| 2015/0269440 A1* | 9/2015 | Lund | H04N 7/18 | 348/158 |
| 2016/0155011 A1* | 6/2016 | Sulc | G06T 7/73 | 382/103 |
| 2016/0371634 A1* | 12/2016 | Kumar | G06Q 10/087 | |
| 2017/0039498 A1* | 2/2017 | Vasgaard | G06Q 10/06313 | |
| 2017/0039741 A1* | 2/2017 | Bhatnagar | G06Q 40/12 | |
| 2017/0109767 A1* | 4/2017 | Shpanya | G06Q 30/0283 | |
| 2017/0161675 A1* | 6/2017 | Jones | G06Q 10/087 | |
| 2017/0178060 A1* | 6/2017 | Schwartz | G06K 9/4604 | |
| 2017/0178227 A1* | 6/2017 | Graham | G06Q 30/0643 | |
| 2017/0193434 A1* | 7/2017 | Shah | G06Q 10/08 | |
| 2017/0249587 A1* | 8/2017 | Jones | G08B 21/24 | |
| 2017/0255899 A1* | 9/2017 | Taira | G06K 7/10861 | |
| 2017/0270360 A1* | 9/2017 | High | H04N 1/32117 | |

OTHER PUBLICATIONS

Papakiriakopoulos, Dimitrios A., Automatic Detection of Out-of-Shelf Products in the Retail Sector Supply Chain Doctoral Studies in Management Science & Technology, DMST-AUED, 2006 (Year: 2006).*

Discovery Challen Discovers Opportunities with Accurate Shopper Traffic Data Stores.com, Marketing Technology, Dec. 2002 (Year: 2002).*

Papakiriakopoulos, Dimitrios A., A decision support system for detecting products missing from the shelf based on heuristic rules Decision Support Systems, vol. 46, 2009 (Year: 2009).*

Bar, Joel, Trax image recognition—application of image recognition & real time insights in the consumer space 2014 (Year: 2014).*

Missed Sales / Out-Of-Stock Calculator HardwareRetailing.com, Apr. 16, 2016, Retrieved from Archive.org Jan. 4, 2018 (Year: 2016).*

Trax image recognition—Next Gen Store Execution Trax, Jun. 2016 (Year: 2016).*

Heller, Walter, Tracking Shoppers Through the Combination Store Progressive Grocer, vol. 67, No. 7, Jul. 1988 (Year: 1988).*

Gruen, Thomas W. et al., A Comprehensive Guide to Retail Out-of-Stock Reduction—In the Fast-Moving Consumer Goods Industry, University of Colorado, 2007 (Year: 2007).*

ShelfHawk product brochure Datalogic Company, 2007 (Year: 2007).*

ShopperTrak product web pages ShopperTrak, Jun. 2003 (Year: 2003).*

Transaction Counts vs. Traffic Counts Headcount.com, Oct. 6, 2014, Retrieved from Archive.org Jan. 4, 2018 (Year: 2014).*

Senior, A.W. et al., Video analytics for retail IEEE, 2007 (Year: 2007).*

International Search Report issued in International Patent Application No. PCT/JP2015/005334, dated Jan. 26, 2016.

* cited by examiner

FIG. 7

DISPLAY IMAGE (MARK IMAGE)

| (IMAGE) | (IMAGE) | (IMAGE) | (IMAGE) |
|---|---|---|---|
| FAST FOOD | RICE | PROCESSED FOOD | FRESH FOODS |
| (IMAGE) | (IMAGE) | (IMAGE) | (IMAGE) |
| CONFECTIONERY | BREAD | MILK PRODUCTS | SWEETS |
| (IMAGE) | (IMAGE) | (IMAGE) | (IMAGE) |
| VEGETABLE AND FRUIT | MISCELLANEOUS COMMODITY | BASIC COMMODITIES | ICE |

RETAIL SALES OPPORTUNITY LOSS CAUSE ANALYSIS BASED ON IMAGE ANALYSIS OF SHELF DISPLAY

TECHNICAL FIELD

The present invention relates to a commodity monitoring device, a commodity monitoring system, and a commodity monitoring method which monitor a sales opportunity loss, based on a captured image of a display area in a store and sales information of the store.

BACKGROUND ART

In the store such as a convenience store, if a display state of commodities displayed on a display shelf is deficient, a sales opportunity loss occurs, and this sales opportunity loss gives a big impact on the sales in the store. The deficiency of the display state means that there are insufficient amount of commodities, there are fewer types of commodities, or there is a so-called face-up shortage in which there is no commodity in the front of the display shelf. Therefore, in a case where the display state of a commodity is deficient, it is necessary to promptly implement a commodity management work (a replenishing work of the amount or types of commodities or an advancing work) to eliminate the deficiency. In considering such a remedy, first, an administrator needs to appropriately recognize the status of a sales opportunity loss in the store, that is, whether or not the sales opportunity loss occurs and a cause of the opportunity loss.

The following technique is known in connection with the business that an administrator of a store recognizes the status of the sales opportunity loss in the store (see PTL 1). An image of a sales floor in which commodities are displayed for each type is captured by a camera, and the number of customers who stay on the sales floor is acquired for each sales floor by using the image. In addition, the sales number for each commodity is acquired by using sales data from a point of sale (POS) system, and the number of staying customers on the sales floor and the sales number are displayed together with the image.

In addition, a technique is known in which the sales data of a POS system and sales of commodities are aggregated for each time zone, and the status of the sales for each time zone is displayed with a list of images of the sales floor at each time zone (see PTL 2).

Further, in the related art, a technique is known in which the need for replenishment of a commodity is determined based on the captured image of a display area, and a notification indicating a replenishing work is performed (see PTL 3).

CITATION LIST

Patent Literature

PTL 1: Japanese Patent Unexamined Publication No. 2013-210953
PTL 2: Japanese Patent No. 5072985
PTL 3: Japanese Patent Unexamined Publication No. 5-081552

SUMMARY OF THE INVENTION

The present invention provides a commodity monitoring device, a commodity monitoring system, and a commodity monitoring method which are configured to prevent a sales opportunity loss, by the sales person in a store or the supervisor in a head office easily checking a cause of a sales opportunity loss in a display shelf (a shortage of the amount, type, or face-up of a commodity), and promptly implementing a commodity management work (a replenishing work of the amount or types of commodities or an advancing work).

A commodity monitoring device of the present invention includes a visitor number acquirer, a purchasing customer number acquirer, a statistical information generator, a commodity detector, a sales opportunity loss analyzer, and a display screen generator. The visitor number acquirer acquires the number of customers who visit the store. The purchasing customer number acquirer acquires the number of customers who purchase a commodity, from a sales information management device that manages the sales information of the store. The statistical information generator generates statistical information, based on the number of visitors to a store and the number of purchasing customers. The commodity detector detects displayed commodities based on the captured image of the display area in the store. The sales opportunity loss analyzer detects the occurrence of a sales opportunity loss based on the statistical information, and analyzes a cause of the sales opportunity loss from the detection result of the commodity detector. The display screen generator generates a monitoring screen in which a display image representing the cause of the sales opportunity loss analyzed by the sales opportunity loss analyzer is superimposed on the image of the display area.

A commodity monitoring system of the present invention is a commodity monitoring system which monitors a sales opportunity loss, based on the number of visitors to a store, the number of purchasing customers in the store, and a captured image of a display area of a commodity. This system includes a camera that captures a display area, and an information processing device. The information processing device has the same configuration as that of the commodity monitoring device.

A commodity monitoring method of the present invention is a commodity monitoring method causing an information processing device to execute a process of monitoring a sales opportunity loss, based on the number of visitors to a store and a purchasing customer number in the store and a captured image of a display area of a commodity. By using this method, the number of visitors to a store is acquired, and the number of customers who purchase a commodity is acquired from a sales information management device that manages the sales information of the same store. Statistical information is generated, based on the number of visitors to a store and the number of purchasing customers. Furthermore, displayed commodities are detected based on the captured image of the display area at the same store, the occurrence of a sales opportunity loss is detected based on the statistical information, and a cause of the sales opportunity loss is analyzed based on the detection result of the commodity. A monitoring screen is generated in which a display image representing the analyzed cause of the sales opportunity loss is superimposed on the image of the display area.

According to the present invention, since a cause of a sales opportunity loss from the commodity shelves is analyzed and the display image illustrating the cause is added to a monitoring image of the display state of the commodity shelves, the user can promptly recognize a commodity shelf at which there is the sales opportunity loss and the cause thereof. Thus, it is possible to prevent a sales opportunity loss, by the store staff member executing quickly the commodity management work.

BRIEF DESCRIPTION OF DRAWINGS

FIG. 7 is an explanatory view illustrating a monitoring screen on which a display image representing a cause of a sales opportunity loss is superimposed.

DESCRIPTION OF EMBODIMENT

Figure 1:
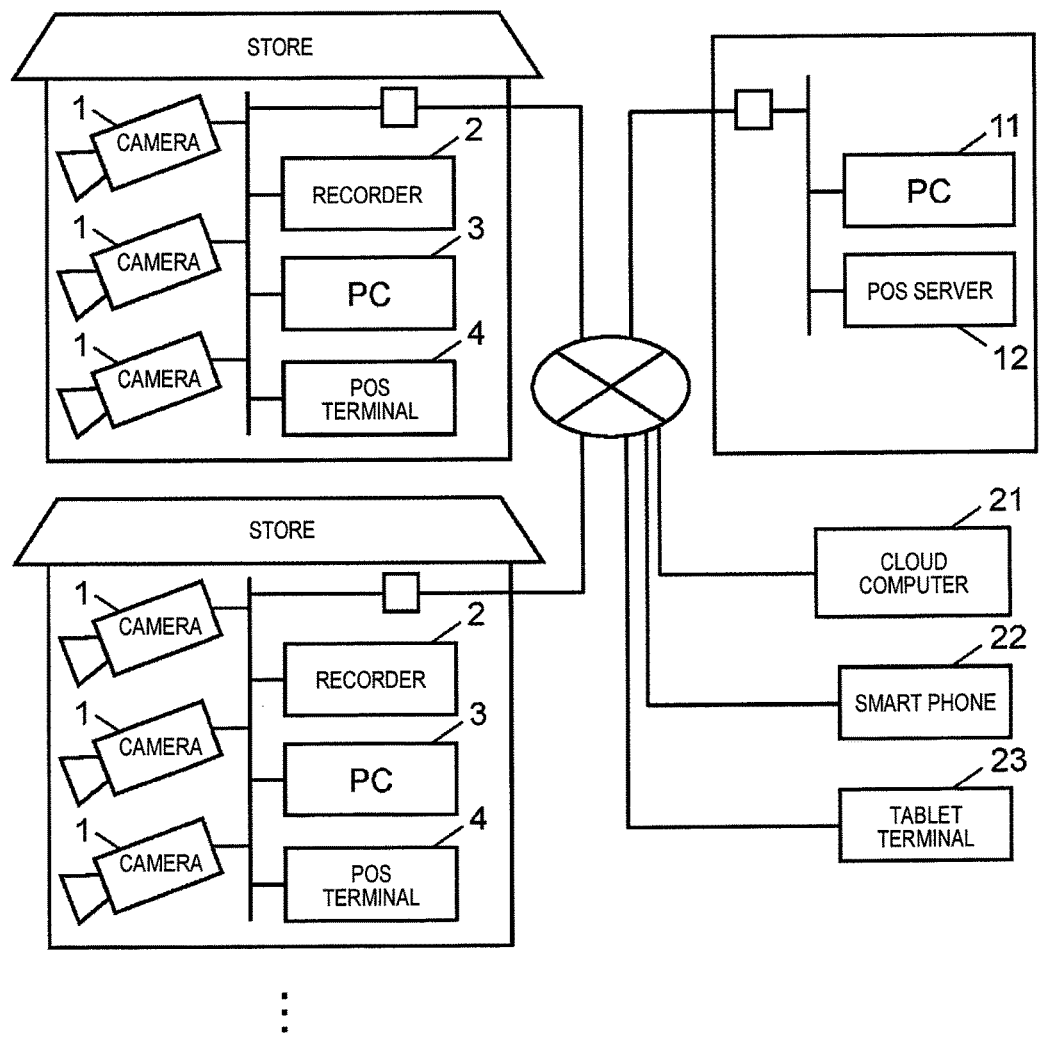
FIG. 1 is an overall configuration diagram of a commodity monitoring system according to the present embodiment.

Prior to the description of the embodiments of the present invention, a brief description will be given on problems in the related art. In the techniques disclosed in PTL 1 and 2, the number of staying customers and the number of purchased commodities in a sales floor are displayed together with an image of the sales floor, it is possible to recognize a status where the number of staying customers is large and the number of purchased commodities is small. However, in these related arts, since the display contents in each sales floor is checked, the status of opportunity loss is only determined for each individual sales floor. First, if it is assumed that the status of an opportunity loss in the entire store is recognized and thereafter, the status of the opportunity loss is examined in detail, the efficiency of the business is significantly reduced.

In the above-described technique disclosed in PTL 3, it is possible to monitor the display status of a commodity in the display area, and instruct the store staff member to perform a commodity management work (an arranging work or a replenishing work) as necessary. However, the store staff member cannot easily recognize a cause of an opportunity loss in any book shelf.

A first aspect of the invention made to solve this problem is a commodity monitoring device. The commodity monitoring device includes a visitor number acquirer, a purchasing customer number acquirer, a statistical information generator, a commodity detector, a sales opportunity loss analyzer, and a display screen generator. The visitor number acquirer acquires the number of customers who visit the store. The purchasing customer number acquirer acquires the number of customers who purchase a commodity, from a sales information management device that manages the sales information of the store. The statistical information generator generates statistical information, based on the number of visitors to a store and the number of purchasing customers. The commodity detector detects displayed commodities based on the captured image of the display area in the store. The sales opportunity loss analyzer detects the occurrence of a sales opportunity loss based on the statistical information, and analyzes a cause of the sales opportunity loss from the detection result of the commodity detector. The display screen generator generates a monitoring screen in which a display image representing the cause of the sales opportunity loss analyzed by the sales opportunity loss analyzer is superimposed on the image of the display area.

According to this, the store staff member can easily check the cause of sales opportunity loss in the display shelf (a shortage of the amount, type, or face-up of a commodity), and promptly implement a commodity management work (a replenishing work of the amount or types of commodities or an advancing work), such that it is possible to prevent a sales opportunity loss.

It is preferable that the commodity detector detects a commodity, from images of the interior of the state monitoring area which is set as an area including displayed commodities, in captured image of the display area.

According to this, a display shelf is specified from an image of a display area and a commodity is detected, such that it is possible to detect a commodity easily and quickly.

It is preferable that the commodity detector detects a commodity that matches the pre-stored commodity image, from the image, and in a case where there is a commodity that matches the commodity image, counts the number of types of commodities as a single type.

According to this, since it is possible to detect whether or not the stored commodity images are arranged on the display shelf, it is possible to recognize a commodity type number shortage, which can be a cause of a sales opportunity loss, by storing a plurality of types of commodity images required for an assortment.

It is preferable that the commodity detector detects an occupancy rate of the commodity that matches the pre-stored commodity image, from the images.

According to this, since it is possible to detect a degree of display amounts in which the stored commodity image is arranged in the display shelf, it is possible to recognize a display amount shortage of a specific commodity such as popular commodities that becomes a cause of a sales opportunity loss.

It is preferable that the commodity detector detects an occupancy rate of a commodity, from an area which is set as a front row of the display shelf, in the image.

According to this, since it is possible to detect whether or not commodities are arranged in the front row of the display shelf from which customers easily take commodities, thereby recognizing a so-called face-up shortage, can be the cause of the sales opportunity loss, in which there is no commodity in the front of the display shelf.

It is preferable that the commodity detector sets, in the image, rows in a front horizontal direction of the display shelf as horizontal rows, rows in a front vertical direction of the display shelf as vertical rows, a row on a front side of the display shelf out of the horizontal rows as a front row, and a row on a rear side of the display shelf as a rear row, and detects the number of vertical rows which are counted based on the presence or absence of commodities in the front row and the rear row.

According to this, since a determination is made in consideration of not only the presence or absence of a commodity in the front row of the display shelf, but also the presence or absence of a commodity in the rear row of the display shelf, it is possible to more correctly recognize a so-called face-up shortage, that can be the cause of the sales opportunity loss and commodities are not exhibited in the front of the display shelf.

It is preferable that the sales opportunity loss analyzer analyzes the occurrence of a sales opportunity loss, based on the result of comparing a difference between the number of visitors and the number of purchasing customers with a predetermined value, and analyzes a cause of the sales opportunity loss as a display amount shortage in a case where the display amount of displayed commodities is the predetermined amount or less or is less than the predetermined amount, from the detection result by the commodity detector.

According to this, the display amount of a commodity when the sales opportunity loss actually occurs is examined, and in a case where the display amount is small, the display amount shortage is analyzed to be due to an opportunity loss, so that the cause of the opportunity loss can be recognized and improved promptly.

It is preferable that the sales opportunity loss analyzer analyzes the occurrence of a sales opportunity loss, based on the result of comparing a difference between the number of visitors and the number of purchasing customers with a predetermined value, and analyzes a type number shortage as the cause of the sales opportunity loss in a case where the number of types of displayed commodities is the predetermined number or less or is less than the predetermined amount, from the detection result by the commodity detector.

According to this, the number of types of commodities when the sales opportunity loss actually occurs is examined, and in a case where the number of types is small, a type number shortage is analyzed as the cause of an opportunity loss. Therefore, it is possible to promptly recognize and improve the cause of the opportunity loss.

It is preferable that the sales opportunity loss analyzer analyzes the occurrence of a sales opportunity loss, based on the result of comparing a difference between the number of visitors and the number of purchasing customers with a predetermined value, and analyzes a cause of the sales opportunity loss as a face-up shortage in a case where the display amount of commodities displayed in the front row of the display shelf is the predetermined amount or less or is less than the predetermined amount, from the detection result by the commodity detector.

According to this, the display amount in the front row of the display shelf when the sales opportunity loss actually occurs is examined, and in a case where the display amount is small, the opportunity loss is analyzed to be due to a so-called face-up shortage in which there is no commodity in the front of the display shelf. Therefore, it is possible to promptly recognize and improve the cause of the opportunity loss.

The sales opportunity loss analyzer analyzes the occurrence of a sales opportunity loss, based on the result of comparing a difference between the number of visitors and the number of purchasing customers with a predetermined value. The face-up shortage rate is obtained from the number of vertical rows in which commodities are in rear rows and the number of vertical rows in which there is no commodity in the front row and commodities are in rear rows, from the detection result by the commodity detector, and in a case where the face-up shortage rate is a predetermined value or more, or over the predetermined value, the cause of the sales opportunity loss is analyzed to be a face-up shortage. The sales opportunity loss analyzer is preferably configured in this manner.

According to this, since analysis is made in consideration of the availability of commodities in both the front row and the rear row of the display shelf when the sales opportunity loss actually occurs, the cause of the opportunity loss can be analyzed to a so-called face-up shortage in which commodities are in the rear parts of the display shelf and there is no commodity in the front part thereof. Therefore, it is possible to promptly recognize and improve the cause of the opportunity loss.

Further, it is preferable that the display screen generator generates a monitoring screen in which display images of the same shape that are color-coded for each cause of a sales opportunity loss is superimposed on the image of the display area.

In this way, in a case where there are a plurality of opportunity loss causes, the causes are displayed at the same time on the image of the display area so as to be distinguished from each other, such that the user can recognize a display area and a cause of the occurred opportunity loss, just by looking at the monitoring screen.

Further, it is preferable that the display screen generator generates a monitoring screen in which a display image representing the cause of the sales opportunity loss is superimposed on the image of a display area such that a degree is able to be determined from mild to severe.

According to this, the degree (mild to severe) of the cause of the sales opportunity loss is displayed so as to be determined on the image of the display area where the loss is occurring, such that the user can recognize a display area, a cause, and a degree of severity of the occurred opportunity loss, only by looking at the monitoring screen.

It is preferable that the display screen generator displays statistical information along a time axis, and generates a monitoring screen in which a display image representing the cause of the sales opportunity loss in the corresponding time is superimposed on the image of the display area corresponding to the selected time on the time axis.

According to this, if the transition of the number of visitors and the number of purchasing customers of each time is viewed and for example, a time zone having a large difference between them, that is, a time zone during which a sales opportunity loss occurs is selected, the image of the display area of the time zone is displayed along with the cause of the opportunity loss. Therefore, it is possible to simply check the opportunity loss of a desired time zone.

When the sales opportunity loss analyzer analyzes that a sales opportunity loss does not occur based on the result of comparing a difference between the number of visitors and the number of purchasing customers with a predetermined value, it is preferable to calculate the average value of the display amount of commodities detected by the commodity detector.

According to this, it is possible to obtain a suitable commodity display amount when a sales opportunity loss does not occur.

The sales opportunity loss analyzer analyzes the occurrence of a sales opportunity loss, based on the result of comparing a difference between the number of visitors and the number of purchasing customers with a predetermined value. In a case where the display amount of commodities is a predetermined value which is set based on the average value or less or is less than the predetermined value, from the detection result by the commodity detector, the cause of the sales opportunity loss is analyzed to be a display amount shortage. The sales opportunity loss analyzer is preferably configured in this manner.

According to this, since it is determined whether or not the display amount shortage is the cause of the opportunity loss by comparing the display amounts of commodities when a sales opportunity loss actually occurs with a predetermined value which is set based on the average value of the display amounts of commodities when a sales opportunity loss does not occur, it is possible to clarify an appropriate range of the display amounts which does not become the cause of an opportunity loss, and this leads to more accurate analysis.

A second aspect of the present invention is a commodity monitoring system which monitors a sales opportunity loss, based on the number of visitors to a store, the number of purchasing customers in the store, and a captured image of a display area of a commodity. This system includes a camera that captures a display area, and an information processing device. The information processing device has the same configuration as that of the commodity monitoring device of the first aspect of the invention.

According to this, the store staff member can easily check the cause of sales opportunity loss in the display shelf (a shortage of the amount, type, or face-up of a commodity), and promptly implement a commodity management work (a replenishing work of the amount or types of commodities or an advancing work), such that it is possible to prevent a sales opportunity loss.

A third aspect of the present invention is a commodity monitoring method causing an information processing device to perform a process of monitoring a sales opportunity loss, based on the number of visitors to the store, the number of purchasing customers in the store, and captured images of the display area of a commodity. By using this method, the number of visitors to a store is acquired, and the number of customers who purchase a commodity is acquired from a sales information management device that manages the sales information of the same store. Statistical information is generated, based on the number of visitors to a store and the number of purchasing customers. Furthermore, displayed commodities are detected based on the captured image of the display area at the same store, the occurrence of a sales opportunity loss is detected based on the statistical information, and the cause of the sales opportunity loss is analyzed based on the detection result of the commodity. A monitoring screen is generated in which a display image representing the analyzed cause of the sales opportunity loss is superimposed on the image of the display area.

According to this, the store staff member can easily check the cause of sales opportunity loss in the display shelf (a shortage of the amount, type, or face-up of a commodity), and promptly implement a commodity management work (a replenishing work of the amount or types of commodities or an advancing work), such that it is possible to prevent a sales opportunity loss.

Hereinafter, an embodiment of the present invention will be described with reference to the drawings.

FIG. 1 is an overall configuration diagram of a commodity monitoring system according to the present embodiment. The commodity monitoring system is constructed for retail chain stores such as convenience stores. The commodity monitoring system includes camera 1 installed for each of a plurality of stores, recorders (image storage device) 2, PC (information processing device) 3, POS terminal (sales information management device) 4, PC (information processing device) 11 installed in the head office that integrally controls the plurality of stores, POS server (sales information management device) 12, and at least one of cloud computer 21, smart phone 22 or tablet terminal 23. Cloud computer 21 constitutes a cloud computing system, which is provided on the network. Monitoring is possible at any place using smart phone 22 and tablet terminal 23.

Cameras 1 are installed at appropriate locations in a store to capture an interior of the store, and images obtained thereby are recorded by recorder 2. PC 3 installed in a store which is a commodity monitoring device and PC 11 installed in the head office can display the image of the interior of the store captured by camera 1 in real time, and display the past images of the interior of the store recorded in recorder 2, and this allows a user at the store or the head office to check the status in the store.

PC 11 installed in the head office is configured as a facility management support device that supports the business of a supervisor who manages the store. Further, the information generated by PC 11 can be viewed by the supervisor on the monitor of PC 11, and the information is sent to PC 3 installed in a store and can be viewed by a store manager or the like even in PC 3. In this way, PC 3 and PC 11 are configured as a browsing device. Smart phone 22 or tablet terminals 23 can be configured as a browsing device.

POS terminal 4 is installed in the checkout counter of a store, and is operated by a store staff member to perform accounting of the commodity purchased by a customer. POS terminal 4 and POS server 12 installed in the head office constitutes a POS system (sales information management system) that manages sales information regarding sales at each store. In this POS system, information such as the name, type, quantity, amount of money, and accounting time of the commodity purchased by the customer is managed as sales information. The sales information is shared between POS terminal 4 and POS server 12, POS terminal 4 manages sales information of the store where it is installed, and POS server 12 manages sales information of all the stores.

Figure 2:
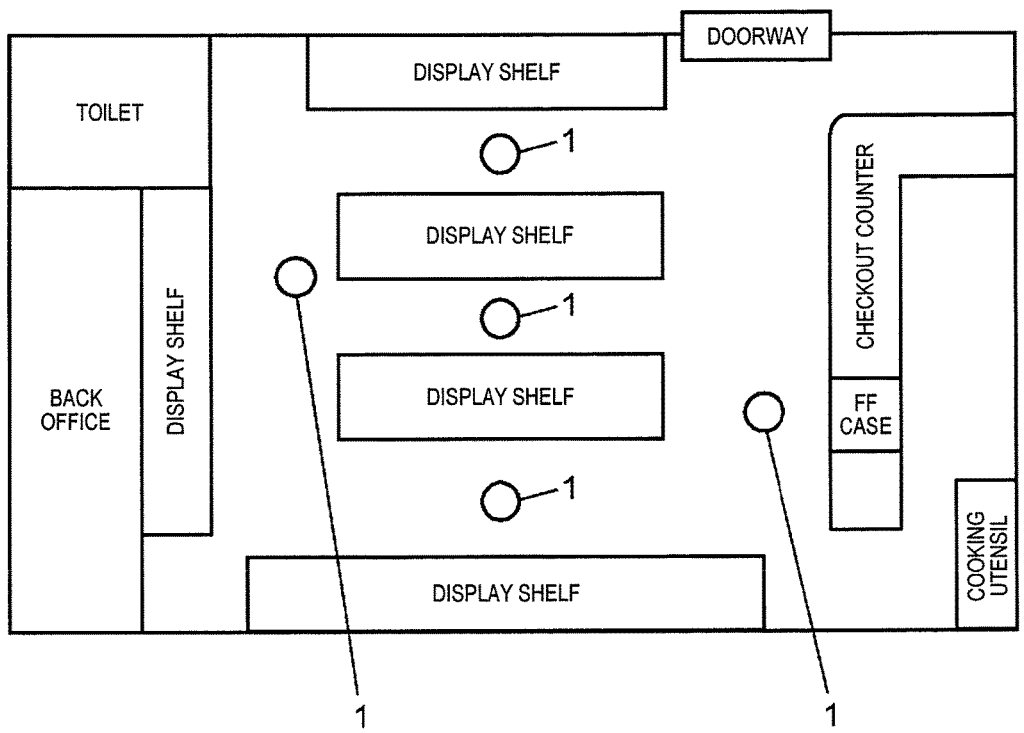
FIG. 2 is a plan view of a store illustrating a layout of a store and an installation status of cameras.

Next, a layout of a store and an installation status of cameras 1 will be described, with a convenience store as an example. FIG. 2 is a plan view of a store illustrating a layout of a store and an installation state of camera 1.

The store includes a doorway, display shelves, checkout counters, cooking utensils, and the like. The display shelves are set up for respective types of commodities, such as fast food, rice (commodities such as rice balls, lunch boxes, and sushi), processed foods, miscellaneous commodities, fresh foods, magazines, newspapers and the like. Cooking utensils are used to cook fast food such as fried chicken in the store, and display shelves for fast food (FF case) are arranged next to the checkout counter. A customer enters the store through the doorway, moves in the store through passages between the display shelves, and when a desired commodity is found, goes to the checkout counter with the commodity, and makes payment (pays for the commodity) at the checkout counter before exiting the store through the doorway.

In addition, a plurality of cameras 1 which take images of the interior of a store are installed in the store. Cameras are installed at appropriate positions on the ceiling in the store. In particular, in the example illustrated in FIG. 2, an omnidirectional camera having a photographing range of 360 degrees using a fisheye lens is used as camera 1, and commodities displayed on the display shelves or the like, people entering and leaving the store from the doorway, people staying in the store, and the like can be captured by camera 1. By counting the people captured in the store, it is possible to obtain the number of customers visiting the store (the number of visitors). The number of customers who enter and exit the store (the number of visitors) may be acquired from images captured by camera, or may be counted by a detection sensor provided in the doorway.

Figure 3:
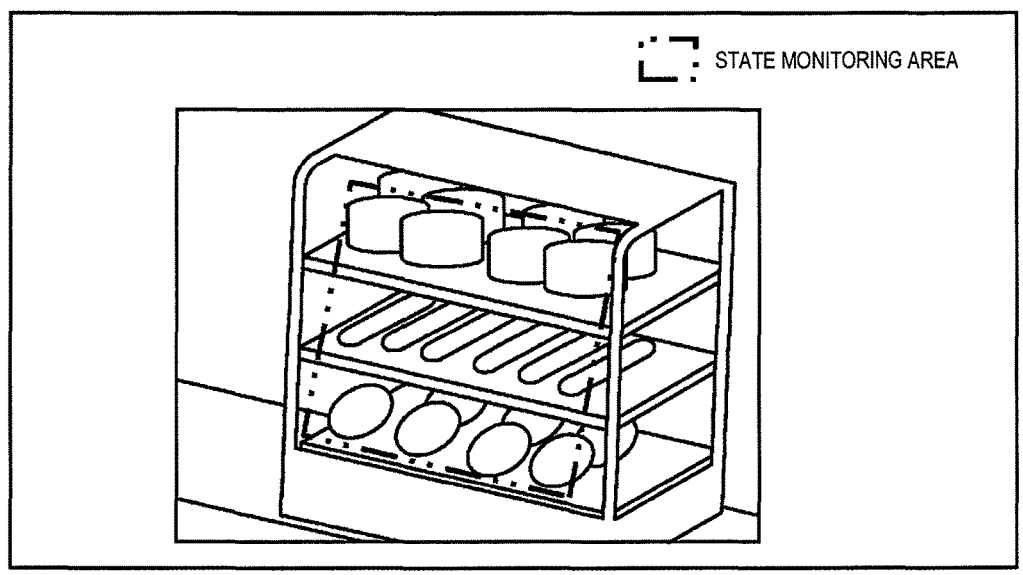
FIG. 3 is an explanatory view illustrating a state monitoring area which is set on an image of a display area.

Next, the outline of a process performed by PC 3 illustrated in FIG. 1 will be described. FIG. 3 is an explanatory view illustrating a state monitoring area which is set on an image of a display area captured by camera 1. On the image of a display area, a state monitoring area, which is set as an area for detecting a commodity, is indicated by a two-dot chain line. The state monitoring area may be set by the user using an input device after viewing the image of the display area, or may be set as a state monitoring area by automatically executing image-recognition of display shelves from the image of the display area.

In the present embodiment, as illustrated in FIG. 3, state monitoring areas are set in areas in which commodities are placed, in an image of a display area (a display shelf, or the like), and the opportunity loss cause of a commodity for each state monitoring area is analyzed. In the example illustrated in FIG. 3, although an entire area (a part indicated by a dotted line) including all stages of a single display shelf is set as a state monitoring area, a plurality of the state monitoring areas may be set for each of stages of the shelf, or for the left and right parts of the same stage. In addition, in a case where there are a plurality of display shelves in the image of the display area, each of the display shelves may be set as the state monitoring area. Thus, setting the area for detecting a commodity (the state monitoring area) in the image of the display area enables easy and quick detection of a commodity. In a case where a plurality of state monitoring areas are set in the image of a single display area, the opportunity loss cause of the respective state monitoring areas may be analyzed, and the results may be aggregated and used as an analytical result for a single display area. At that time, if there is an opportunity loss cause even in a single display area, the cause may be displayed.

Figure 4:
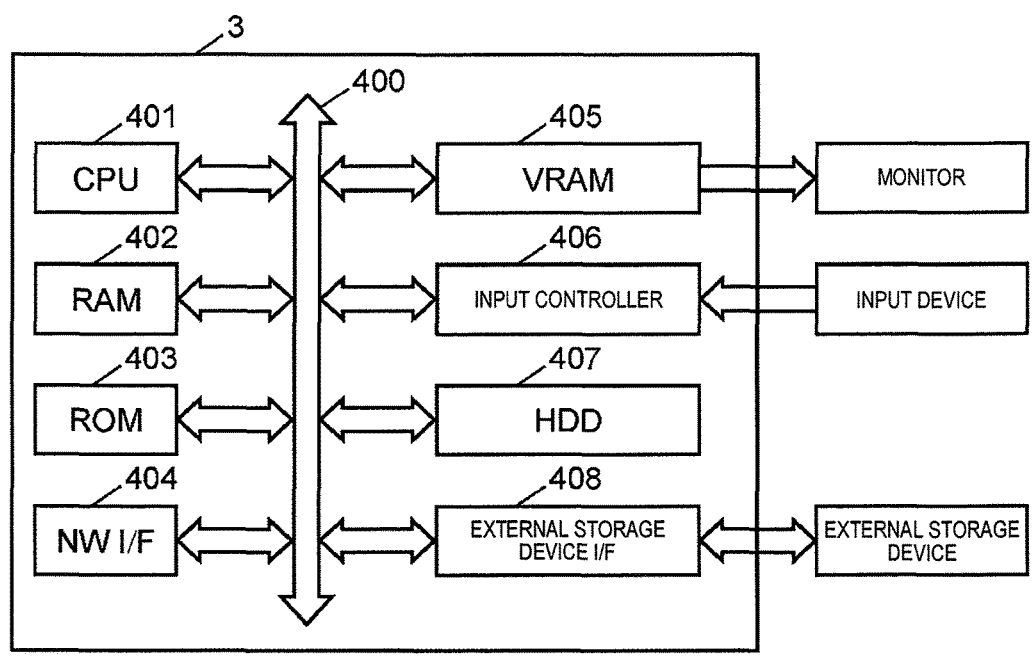
FIG. 4 is a hard block diagram illustrating a schematic configuration of a personal computer (PC) which is a commodity monitoring device.

Next, FIG. 4 is a hardware block diagram of PC 3 (information processing device) that is installed in a store. PC 3 includes bus 400 which connects respective units, central processing unit (CPU) 401, random access memory (RAM) 402, read only memory (ROM) 403, network interface (NW I/F) 404, video RAM (VRAM) 405, input controller 406, a hard disk drive (HDD) 407, and an external storage device interface 408. CPU 401 controls a computer system. ROM 403 stores programs which are executed by CPU 401 and realize an operation process procedure and each functional configuration of a commodity monitoring system. Network interface 404 performs data transfer with external devices through a network is performed in network interface 404. VRAM 405 is used for displaying the image information on the monitor. Input controller 406 controls input signals input from an input device including a keyboard, a pointing device, or the like. External storage device interface 408 is used for control of the input and output from the external storage device.

Figure 5:
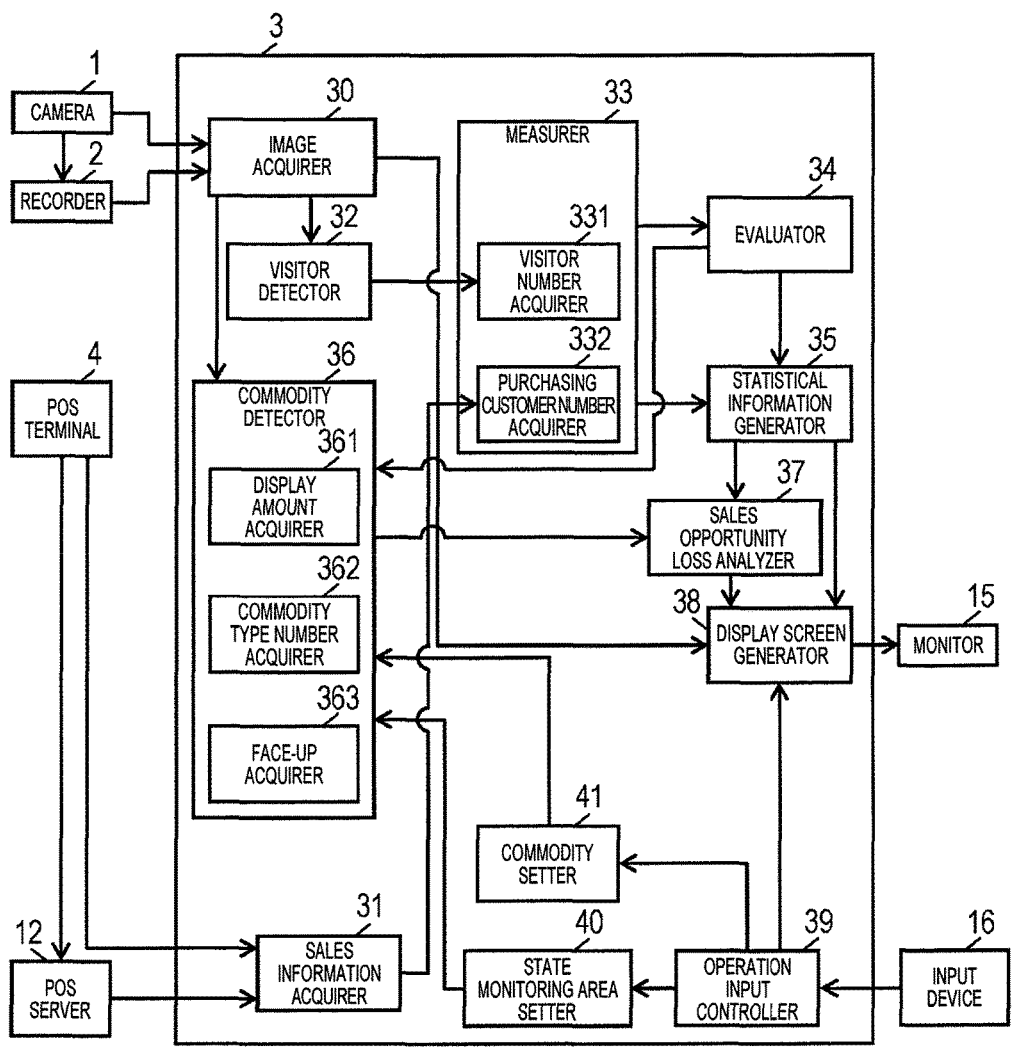
FIG. 5 is a functional block diagram illustrating a schematic configuration of the PC illustrated in FIG. 4.

Next, FIG. 5 is a functional block diagram illustrating a schematic configuration of PC 3 in stalled in a store. PC 3 includes image acquirer 30, sales information acquirer 31, visitor detector 32, measurer 33, evaluator 34, statistical information generator 35, commodity detector 36, a sales opportunity loss analyzer 37, display screen generator 38, operation input controller 39, state monitoring area setter 40, and commodity setter 41. Image acquirer 30 acquires images from camera 1 or recorder 2. Sales information acquirer 31 acquires sales information from POS server 12 installed in the head office or POS terminal 4 installation in the store. Visitor detector 32 detects visitors from an image. Measurer 33 measures the number of the detected visitors and the number of purchasing customers obtained from the sales information. Evaluator 34 evaluates the presence or absence of the occurrence of an opportunity loss, based on the measured number of visitors and the number of purchasing customers. Statistical information generator 35 generates statistical information indicating the temporal transition of the number of the measured customers. Commodity detector 36 detects a commodity from images. Sales opportunity loss analyzer 37 analyzes a cause of the sales opportunity loss based on the detection result of a commodity. Display screen generator 38 displays the cause of an opportunity loss on monitor 15 by superimposing it on the image. Operation input controller 39 controls the operation input from input device 16. State monitoring area setter 40 sets a state monitoring area in response to an operation input. Commodity setter 41 previously sets the image of a commodity to be detected when commodity detector 36 detects a specific commodity.

Each functional configuration illustrated in FIG. 5 is achieved by controlling each piece of hardware, by CPU 401 executing the programs stored in ROM 403. These programs may be configured as a dedicated device which is previously introduced into PC 3 which is the information processing device. It may also be recorded in an appropriate program recording medium as an application program operating on a general purpose operating system (OS). Further, it may be provided to the user through a network. In addition, PC 11 is also the same as in PC 3.

In FIG. 5, image acquirer 30 acquires captured images of the interior of a store from camera 1 and recorder 2. Here, images are acquired from camera 1 in the case of displaying the status of the day in real time, and images are acquired from recorder 2 in the case of displaying the status for the past predetermined period.

Sales information acquirer 31 acquires sales information from POS server 12 or POS terminal 4. The sales information includes information such as an accounting time (an issue time of a receipt) of each customer, the name, type, amount of money, and quantity of commodities purchased by a customer.

Visitor detector 32 executes a process for detecting the customers entering the store from the doorway, through a person detecting process of detecting a person from a captured image of doorway. A well-known image analysis technique may be used for the person detection process. Visitor detector 32 acquires the visiting time of each customer, from the photographing time of the image in which the customers entering the store from the doorway are detected.

In this embodiment, visitor detector 32 is assumed to detect customers who visit the store, but this is not limited to detection of the customers who enter the store from the doorway, and customers staying in the store may be detected.

In the present embodiment, since person recognition (individual identification) is not performed, if the same person enters the sales floor several times, the person is detected multiply, but person recognition may be performed in order to avoid the duplication.

Measurer 33 includes visitor number acquirer 331 that measures the number of visitors for a predetermined measurement period (for 15 minutes), based on the detection result by visitor detector 32, and purchasing customer number acquirer 332 that measures the number of purchasing customers for a predetermined measurement period (for 15 minutes), based on the sales information acquired by sales information acquirer 31.

Visitor number acquirer 331 executes a process of acquiring the number of visitors for each predetermined measurement period, that is, the number of customers visiting the store during the measurement period, based on the visiting time for each customer acquired by visitor detector 32.

Purchasing customer number acquirer 332 executes a process of acquiring the number of purchasing customers for each predetermined measurement period, that is, the number of customers who perform the accounting for all the stores during the measurement period, in other words, the number of customers who purchase some commodities at the store, based on the accounting time of each customer acquired by sales information acquirer 31. The total number of purchasing customers is equal to the number of receipts issued in stores.

Evaluator 34 evaluates the occurrence status of opportunity loss for each time zone, based on the measured values (the number of visitors and the number of purchasing customers) acquired by measurer 33. The time zone when opportunity loss occurs may be extracted.

Statistical information generator 35 executes a process of aggregating measurement values (the number of visitors and the number of purchasing customers) for each measurement time (for 15 minutes) acquired from measurer 33 for a predetermined unit period, and acquiring the number of customers for each unit period, and generating statistical information indicating temporal transition of the number of customers. In addition, statistical information generator 35 adds information on time zone at which opportunity loss occurs obtained from evaluator 34 to the statistics information. The statistical information generated by statistical information generator 35 is sent to display screen generator 38.

Figure 6:
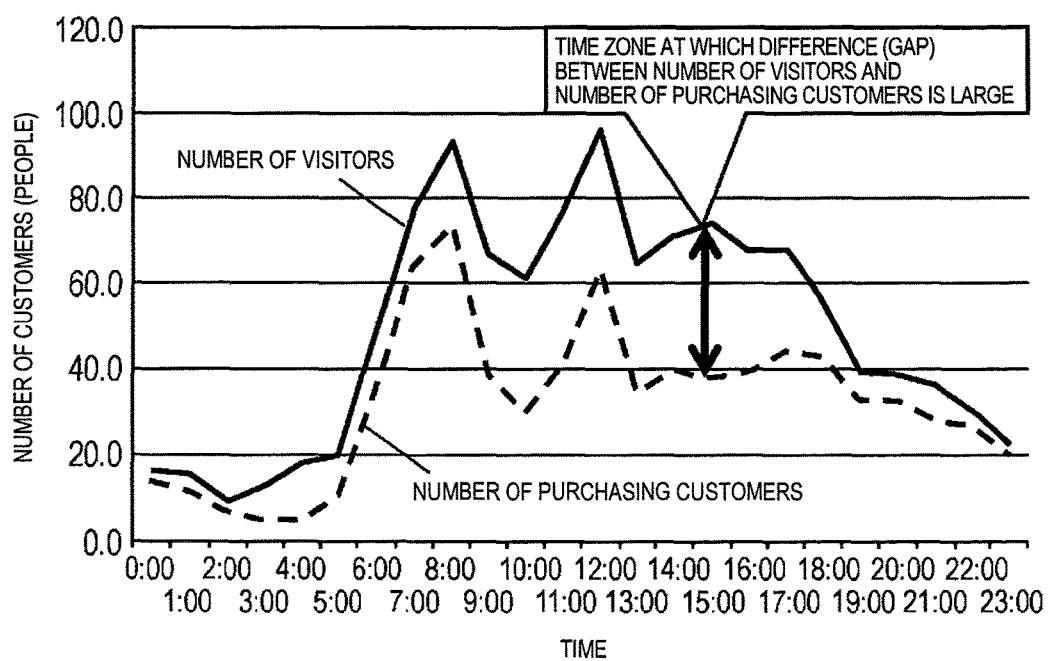
FIG. 6 is an explanatory view illustrating an example of statistical information.

FIG. 6 is an explanatory view illustrating an example of statistical information displayed on monitor 15 by display screen generator 38. The vertical axis indicates the number of customers, and the horizontal axis indicates time. As illustrated in FIG. 6, statistical information of the number of visitors and the number of purchasing customers (in this example, aggregated hourly) is displayed graphically. In the example of FIG. 6, the solid line indicates the transition of the number of visitors, and the dotted line indicates the transition of the number of purchasing customers. The time zone at which the number of visitors is large and the number of purchasing customers is small, that is, a difference (gap) therebetween is large may be displayed as a time zone in which opportunity loss occurs, in a display form urging attention. If an arbitrary time zone in the graph illustrated in FIG. 6 is clicked, a monitoring screen of the display area at the corresponding time zone may be displayed.

In the present embodiment, it is assumed that statistical information generator 35 executes an aggregation process, with unit period as a time zone, but the unit period may be one day, one week, or one month. Further, in the present embodiment, it is assumed that measurer 33 acquires the number of customers (the number of visitors and the number of purchasing customers) for each predetermined measurement period, with the measurement period as 15 minutes, but the measurement period may be any period.

Commodity detector 36 executes a process for detecting the displayed commodities based on the image of the display area acquired by image acquirer 30. In the present embodiment, as illustrated in FIG. 3, commodities are detected from the image of the state monitoring area set by the user using state monitoring area setter 40.

Display amount acquirer 361 acquires a commodity occupancy rate in each state monitoring area that is a ratio of occupied pixels representing objects assumed to be commodities. Specifically, pixels representing objects assumed to be commodities are detected from the image of the state monitoring area cut out from the image of the display area, and the ratio of the pixels representing the objects assumed to be commodities to all the pixels may be set as a commodity occupancy rate. Further, for example, an image captured in a state where commodities are not displayed is used as a background, and the pixels representing the objects assumed to be commodities may be detected based on a difference from the background.

Commodity type number acquirer 362 acquires a specific commodity occupancy rate of a specific commodity in each state monitoring area, that is, a ratio of occupied pixels representing objects assumed to be a specific commodity, for each specific commodity. Specifically, pixels representing objects that match the commodity image which is previously stored as a specific commodity are detected from the image of the state monitoring area cut out from the image of the display area, and the ratio of the pixels representing the specific commodity to all the pixels may be set as a specific commodity occupancy rate. In a case where a plurality of specific commodities are set, each specific commodity occupancy rate is achieved, and the number of specific commodities for which the specific commodity occupancy rate is obtained is measured as the number of commodity types. Thus, it is possible to detect the type and the amount of displayed commodities.

Face-up acquirer 363 obtains a ratio at which commodities are present in the front row of the display shelf of each state monitoring area, that is, a front row commodity occupancy rate at which the pixels representing objects assumed to be commodities occupy the front row of the display shelf. Specifically, an image specified as the front row area is extracted from the image of the state monitoring area cut out from the image of the display area, pixels representing objects assumed to be commodities are detected from the image of the front row area, and a ratio of the pixels representing objects assumed to be commodities to all the pixels representing the front row area may be set as a front row commodity occupancy rate. In this way, it is possible to detect the face-up shortage in which the front row of the display shelf is empty. With respect to the range of the front row in the display shelf, the user may set the range of the front row area from the image by using an input device, or a predetermined range may be set in advance.

Face-up acquirer 363 may determine a face-up shortage from the availability of commodities in the front row and the rear row of the display shelf, instead of the above. In that case, the number of rows in which commodities are present in the rear row of the display shelf and the number of rows in which commodities are not present in the front row of the display shelf and commodities are present in the rear row are obtained from the image of the state monitoring area. A ratio at which there is no commodity in the front row and commodities are in the rear row is calculated as a face-up shortage rate. In this way, it is possible to detect a face-up shortage in which commodities are in the rear row of the display shelf and the front row of the display shelf is empty.

Sales opportunity loss analyzer 37 executes a process of analyzing the cause of the sales opportunity loss based on the detection result by commodity detector 36. Sales opportunity loss analyzer 37 compares the commodity occupancy rate obtained from display amount acquirer 361 with a preset threshold, and analyzes the display amount shortage of a commodity as the cause of the sales opportunity loss in a case where the commodity occupancy rate is the threshold or less or is less than the threshold.

A sales opportunity loss analyzer 37 compares the number of commodity types obtained from commodity type number acquirer 362 with a preset threshold, and analyzes the type number shortage of a commodity as the cause of the sales opportunity loss, in a case where the commodity type number is the threshold or less or is less than the threshold. In addition to analyzing the type of normal sales commodities, for example, it is possible to set time-limited commodities and campaign commodities as specific commodities, and analyze whether or not the commodities that should be focused on promotion are arranged in the display area, and a degree of an occupancy rate with which the commodities are arranged, from the specific commodity occupancy rate.

Sales opportunity loss analyzer 37 compares the front row commodity occupancy rate obtained from face-up acquirer 363 with a preset threshold, and analyzes the face-up shortage of a commodity as the cause of the sales opportunity loss in a case where the front row commodity occupancy rate is the threshold or less or is less than the threshold.

Instead of above, sales opportunity loss analyzer 37 compares the face-up shortage rate obtained from face-up acquirer 363 with a preset threshold, and analyzes the face-up shortage of a commodity as the cause of the sales opportunity loss in a case where the face-up shortage rate is the threshold or more or is over it.

In the case of detecting the extent of a shortage for each cause of opportunity, a determination is made for three states which are a satisfied state, a mild shortage state and a severe shortage state by using two thresholds which are first and second thresholds. In other words, in a case of making a determination based on a satisfaction rate, in a case having a value being equal to or larger than the first threshold is determined as the satisfied state, a case having a value being less than the first threshold and being equal to or larger than the second threshold is determined as the mild shortage state, and a case having a value being less than the second threshold is determined as the severe shortage state. Alternatively, in a case of making a determination based on a shortage rate, a case having a value being equal to or less than the first threshold is determined as the satisfied state, a case having a value being over the first threshold and being equal to or less than the second threshold is determined as the mild shortage state, and a case having a value being over the second threshold is determined as the severe shortage state.

Display screen generator 38 executes a process of generating a monitoring screen used for the user to monitor the display status, and the monitoring screen is displayed on monitor 15. In particular, display screen generator 38 executes a process of displaying a monitoring screen on which a display image (mark image) representing a cause of a sales opportunity loss is superimposed, on the image of the display area with an opportunity loss cause, based on the analysis result by a sales opportunity loss analyzer 37. Display screen generator 38 may display a monitoring screen on which a display image (mark image) representing a cause of a sales opportunity loss is superimposed and the statistical information on the same screen.

FIG. 7 is an explanatory view illustrating a monitoring screen on which a display image representing a cause of a sales opportunity loss in a display area is superimposed. In the example of FIG. 7, the monitoring images of the plurality of display areas in the store are displayed side by side. A display image (mark image) representing the cause of the sales opportunity loss is displayed by being superimposed on the image of the display area. A plurality of opportunity loss causes in each display area are clearly displayed by changing the display color depending on the type of the opportunity loss cause.

In this embodiment, three causes which are the display amount shortage, the type number shortage, and the face-up shortage of a commodity are analyzed as an opportunity loss cause, and a display image (a mark image) of a different color is displayed for each cause. For example, as illustrated in FIG. 7, the displayed image (mark image) has the same shape of a square, and is displayed so that the cause opportunity loss for each display area can be recognized at a glance, with the display amount shortage as red, the type number shortage as pink, and the face-up shortage as orange, or the like. If the same display area has a plurality of causes, a plurality of display images (mark images) representing a plurality of opportunity loss causes are displayed.

Display images (mark images) representing three causes which are a display amount shortage, a type number shortage, and a face-up shortage of a commodity may be color-coded depending on the degree of each shortage. For example, the images are displayed on monitor 15, with the satisfied state as green, the mild shortage state as yellow, and the severe shortage state as red. In this case, the shape of the display image (mark image) may be changed according to the three opportunity loss causes (for example, with the display amount shortage as a square, the type number shortage as a triangle, and the face-up shortage as a circle, or the like). When viewing this image, the user can promptly recognize the opportunity loss cause of a commodity in each display area.

Operation input controller 39 acquires input information, in response to an input operation performed by the user using input device 16 such as a mouse, a keyboard, and the like, on the screen displayed on monitor 15.

State monitoring area setter 40 executes a process of setting an area to be subject to commodity detection (a state monitoring area) from the image of the display area, in response to a user's input operation performed using input device 16, as illustrated in FIG. 3. In this case, an area setting screen displaying a single display area may be displayed on monitor 15, and the state monitoring area may be designated and input on this area setting screen. A plurality of state monitoring areas may be set.

Commodity setter 41 executes a process of setting a specific commodity. In a case where the images of commodities are stored in advance in PC 3 or PC 11, the image of a commodity designated as the specific commodity may be selected and set. In a case where the images are not stored, the captured images of commodities are stored as a specific commodity.

Further, in the present embodiment, various thresholds used in commodity detector 36 may be set on the processing condition setting screen (not illustrated) displayed on monitor 15.

Figure 8:
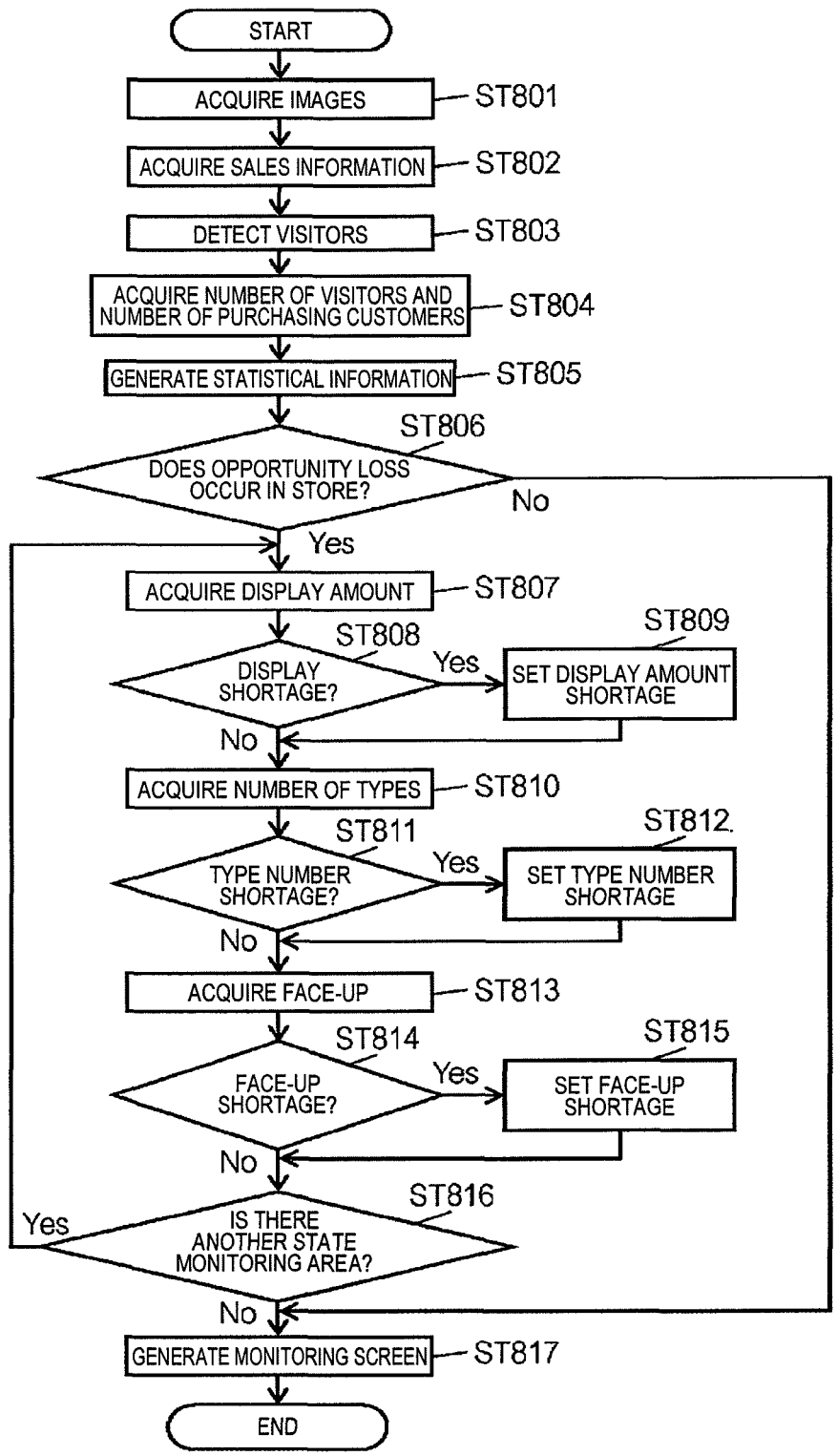
FIG. 8 is an operation flow chart illustrating a procedure of determining the cause of the sales opportunity loss and displaying the cause so as to be superimposed on a monitoring image.

Next, a description will be given of a process executed by the PC 3. FIG. 8 is an operation flow chart illustrating a procedure of determining the cause of a sales opportunity loss and displaying it so as to be superimposed on a monitoring image. In FIG. 8, PC 3 acquires captured images of the interior of a store from camera 1 and recorder 2, by image acquirer 30 (ST801). Here, images are acquired from camera 1 in the case of displaying images in real time, and images are acquired from recorder 2 in the case of displaying the status for the past predetermined period.

Next, sales information acquirer 31 acquires sales information from POS server 12 installed in the head office or POS terminal 4 installation in the store (ST802). The sales information includes information such as an accounting time (an issue time of a receipt) of each customer, the name, type, amount of money, and quantity of commodities purchased by a customer.

Next, visitor detector 32 detects people (visitors) visiting a store from captured images of a doorway acquired in ST801, and acquires the visiting time for each customer, based on the shooting times of images from which people visiting the store are detected (ST803).

Next, measurer 33 acquires the number of visitors for each predetermined measurement period (for 15 minutes), based on the detection result by visitor detector 32, and acquires the number of purchasing customers for each predetermined measurement period (for 15 minutes), based on the sales information acquired from sales information acquirer 31 (ST804).

Next, statistical information generator 35 aggregates measurement values (the number of visitors and the number of purchasing customers) for each measurement time (for 15 minutes) acquired from measurer 33 for a predetermined unit period, and acquires the number of customers (the number of visitors and the number of purchasing customers) for each unit period. Statistical information indicating the temporal transition of the number of visitors is generated (ST805). The generated statistical information can be displayed on monitor 15 by display screen generator 38.

Next, evaluator 34 evaluates the occurrence status of an opportunity loss for each time zone, based on the measured values (the number of visitors and the number of purchasing customers) acquired from measurer 33, and determines whether or not there is a time zone at which a difference (gap) between them is large, that is, the number of visitors is large but the number of purchasing customers is small (a time zone at which an opportunity loss occurs) (ST806). When the opportunity loss does not occur (No in ST806), display screen generator 38 generates the image of the display area as it is as a monitoring screen, without performing commodity detection, and displays it on monitor 15 (ST817).

On the other hand, when the opportunity loss occurs (Yes in ST806), commodity detector 36 detects displayed commodities, based on the image of the display area acquired from image acquirer 30 in the time zone in which the occurrence of an opportunity loss is evaluated by evaluator 34. In the present embodiment, as illustrated in FIG. 3, commodities are detected from images of the state monitoring area which is set by the user using the state monitoring area setter, but, first, display amount acquirer 361 detects pixels representing objects assumed to be commodities from the image of the state monitoring area, and obtains the ratio of the pixels representing objects assumed to be commodities to all the pixels representing the state monitoring area as a commodity occupancy rate (ST807).

Next, sales opportunity loss analyzer 37 compares the commodity occupancy rate obtained from display amount acquirer 361 with a preset threshold, and analyzes a commodity display amount shortage as the cause of the sales opportunity loss in a case where the commodity occupancy rate is the threshold or less or is less than the threshold (Yes in ST808). For example, in a case where the commodity occupancy rate is less than 70%, the display amount may be determined to the cause of the sales opportunity loss. In a case where it is determined as a display amount shortage, cause information indicating that the display area has the display amount shortage is set (ST809).

In the case of setting a plurality of thresholds and detecting the extent of a shortage for the display amount, determination is made for three states which are a satisfied state, a mild shortage state and a severe shortage state. For example, a case where the commodity occupancy rate is 70% or more is determined as a satisfied state, a case when it is less than 70% and 40% or more is determined as a mild shortage state, and a case where it is less than 40% is determined as a severe shortage state. In case where it is determined as the mild shortage state or the severe shortage state, cause information of this fact is set in ST809.

Next, commodity type number acquirer 362 sets the ratio of pixels representing objects that match the commodity image which is previously stored as a specific commodity to all the pixels representing the state monitoring area, from the image of the state monitoring area, as a specific commodity occupancy rate, obtains respective specific commodity occupancy rates with respect to a plurality of stored specific commodities, and counts specific commodities detected from the plurality of stored specific commodities as the number of commodity types (ST810). Thus, it is possible to detect the type and the amount of displayed commodities.

Next, sales opportunity loss analyzer 37 compares the commodity type number obtained from commodity type number acquirer 362 with a preset threshold, and analyzes a type number shortage of a commodity as the cause of the sales opportunity loss in a case where the commodity type number is the threshold or less or is less than the threshold (Yes in ST811). For example, an appropriate upper limit is set in advance as the types of commodities displayed in one state monitoring area, and if the upper limit of the number of commodity types is the denominator and the detected number of types is a numerator, in a case where the ratio is less than 70%, a type number shortage may be determined to be the cause of the sales opportunity loss. In a case where it is determined as the type number shortage, cause information indicating that the display area has the type number shortage is set (ST812).

In the case of setting a plurality of thresholds and detecting the extent of a shortage of the number of types, determination is made for three states which are a satisfied state, a mild shortage state and a severe shortage state. For example, a case where the above ratio is 70% or more is determined as a satisfied state, a case where it is less than 70% and 40% or more is determined as a mild shortage state, and a case where it is less than 40% is determined as a severe shortage state. In a case where it is determined as the mild shortage state or the severe shortage state, cause information indicating the fact is set in ST812.

Next, face-up acquirer 363 obtains a ratio at which commodities are present in the front row of the display shelf from the image of the state monitoring area, that is, a front row commodity occupancy rate at which the pixels representing objects assumed to be commodities occupy the front row of the display shelf (ST813). The user may set the range of the front row in the display shelf. Alternatively, when a commodity is detected, the coordinates of the commodity may be acquired at the same time, and it may be determined whether or not the position of the commodity is the front row of the display shelf based on the acquired coordinates.

Next, as described above, in a case of obtaining only the front row commodity occupancy rate in the face-up acquisition in ST813, sales opportunity loss analyzer 37 compares the front row commodity occupancy rate obtained from face-up acquirer 363 with a preset threshold, and analyzes a face-up shortage of a commodity as the cause of the sales opportunity loss in a case where the front row commodity occupancy rate is the threshold or less or is less than the threshold (Yes in ST814). For example, in a case where the front row commodity occupancy rate is less than 70%, the face-up shortage may be determined to be the cause of the sales opportunity loss.

In the above example, the face-up shortage is determined only depending on whether or not commodities are in the front row of the display shelf, but the face-up shortage may be determined from the status of commodities in the front row and the rear row of the display shelf in order to see that commodities are in the rear row but commodities do not come in the front row. The details are described below.

Figure 9:
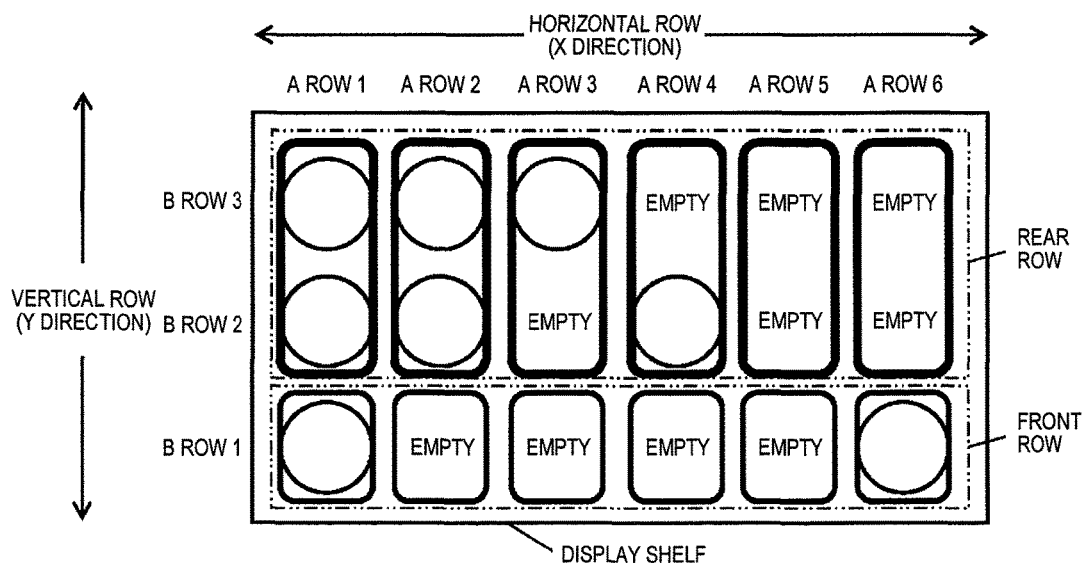
FIG. 9 is an explanatory view for determining a face-up shortage from a front row and a rear row of the display shelf.

FIG. 9 is an explanatory view for determining the face-up shortage from the front row and the rear row of the display shelf. In FIG. 9, six rows (A row 1 to A row 6) arranged in the front horizontal direction (X direction) of the display shelf are denoted as horizontal rows, and three rows (B row 1 to B row 3) arranged in the front vertical direction (Y direction) of the display shelf are denoted as vertical rows, the row (B row 1) facing the aisle side out of the horizontal rows is referred to as a "front row", and the rows (B row 2 and B row 3) on the rear side from the "front row" are referred to as a "rear row".

In FIG. 9, during the face-up acquisition of ST813, face-up acquirer 363 acquires "4", that is, four rows of A row 1, A row 2, A row 3, and A row 4, as the number of rows (the number of first rows) at which commodities are in the rear row (B row 2 and B row 3) of the display shelf, from the image of the state monitoring area. The number of first rows is counted with a row as a unit, if a commodity is in any of the rear rows (B row 2 and B row 3). Next, three rows of A row 2, A row 3, and A row 4, that is, "3" is obtained as the number of rows (the number of second rows) at which there is no commodity in the front row (B row 1) of the display shelf, and commodities are in the rear row (B row 2 and B row 3) thereof.

Next, the ratio (face-up shortage rate) is calculated by using the number of first rows as the denominator and the number of second rows number as a numerator. Here, since 4 is obtained as the number of first rows and 3 is obtained as the number of second rows, the face-up shortage rate is three quarters, that is, 75%.

The shortage rate is obtained with the number of second rows which is the numerator as the number of rows at which there is no commodity in the front row and commodities are in the rear row thereof in FIG. 9, but in the case of obtaining the sufficiency rate, the number of second rows which is the numerator may be the number of rows at which commodities are both in the front row and the rear row. In this case, 4 (A row 1, A row 2, A row 3, and A row 4) is obtained as the number of first rows, 1 (A row 1) is obtained as the number of second rows, and the face-up sufficiency rate is one quarters, that is, 25%. In the case of obtaining the sufficiency rate in this manner, sales opportunity loss analyzer 37 may determine the face-up shortage when the sufficiency rate is the threshold or less or is less than the threshold.

In the example of FIG. 9, a case where there is no commodity in the front row and commodities are in the rear row on the same vertical row is assumed to be the face-up shortage. Therefore, A row 5 at which a commodity is not displayed both in the front row and the rear row does not become the face-up shortage.

The user may set the range of the front row and the rear row in the display shelf. Alternatively, when a commodity is detected, the coordinates of the commodity may be acquired at the same time, and it may be determined whether or not the position of the commodity is the front row or the rear row of the display shelf based on the acquired coordinates.

Next, in a case of calculating the face-up shortage rate in the face-up acquisition in ST813, sales opportunity loss analyzer 37 compares the face-up shortage rate obtained from face-up acquirer 363 with a preset threshold, and analyzes a face-up shortage of a commodity as the cause of the sales opportunity loss in a case where the face-up shortage rate is the threshold or less or is less than the threshold (Yes in ST814). For example, in a case where the face-up shortage rate is 10% or more, the face-up shortage may be determined to be the cause of the sales opportunity loss. In the example of FIG. 9, since the face-up shortage rate as described above is 75%, it is determined as a face-up shortage. In a case where it is determined as the face-up shortage (Yes in ST814), cause information indicating that the display area has the face-up shortage is set (ST815).

In the case of setting a plurality of thresholds and detecting the extent of a face-up shortage, determination is made for three states which are a satisfied state, a mild shortage state and a severe shortage state. In the case where it is determined as the mild shortage state or the severe shortage state, the cause information indicating that fact is set in ST815.

When determining the degree of the face-up shortage only from the front row commodity occupancy rate, for example, a case where the front row commodity occupancy rate is 70% or more is determined as the satisfied state, a case when it is less than 70% and 40% or more is determined as the mild shortage state, and a case where it is less than 40% is determined as the severe shortage state.

Alternatively, when determining the degree of the face-up shortage from the face-up shortage rate which is calculated from the number of first row and the number of second rows, for example, a case where the face-up shortage rate is less than 10% is determined as the satisfied state, a case of being 10% or more and less than 40% is determined as the mild shortage state, and a case of being 40% or more is determined as the severe shortage state.

In a case where it is determined not to be the display amount shortage in ST808 (No in ST808), the process proceeds directly to the type number acquisition process of ST810. If it is determined not to be the type number shortage in ST811 (No in ST811), the process proceeds directly to the face-up acquisition process of ST813.

Next, it is determined not to be the face-up shortage in ST814 (No in ST814), or subsequently to ST815, it is determined whether there is another state monitoring area which is not subject to commodity detection (ST816). If there is a state monitoring area which is not subject to commodity detection (Yes in ST816), the process of ST807 to ST815 is repeated with another state monitoring area as a target. When the commodity detection of all state monitoring areas is completed (No in ST816), display screen generator 38 generates a monitoring screen in which the display image (mark image) representing the cause information of opportunity loss is superimposed on the image of each display area (see FIG. 7) (ST817). The monitoring screen on which a display image representing the cause of the opportunity loss is superimposed and the statistical information such as FIG. 6 may be generated as the same screen.

In a case where a plurality of state monitoring areas are set in a single display area, if there is one state monitoring area in which even one piece of cause information is set by commodity detection, display images (marked image) indicating the cause information of the opportunity loss is superimposed on the monitoring image of the display area. At this time, the color and shape of the display image (mark image) may be changed so as to distinguish the mild severe shortage state or the severe shortage state.

Figure 10:
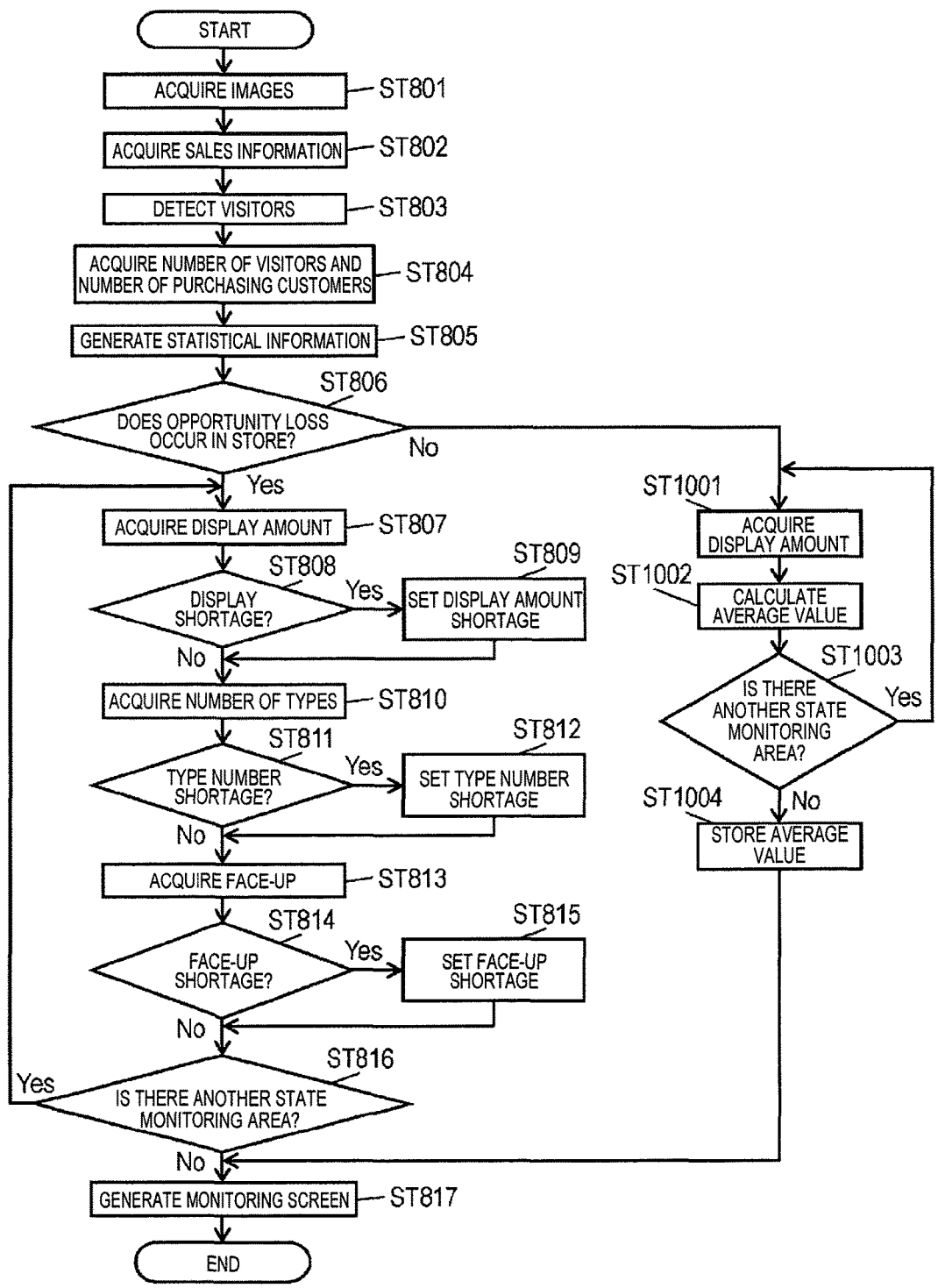
FIG. 10 is an operational flow chart illustrating an operation procedure of modification example of the present embodiment.

Next, a description will be given of another procedure for determining the cause of the sales opportunity loss executed by PC 3 and superimposing and displaying it on the monitoring image. FIG. 10 is an operational flow chart illustrating a procedure of modification example of the present embodiment. There is a difference from FIG. 8 in that steps of ST1001 to ST1004 are added.

In ST806 of FIG. 10, even when it is determined that opportunity loss does not occur (No in ST806) from the statistical information, a commodity is detected from the image of the state monitoring area which is set by the user by the state monitoring area setter. Specifically, as in ST807, display amount acquirer 361 detects pixels representing objects assumed to be commodities from the image of the state monitoring area, and obtains the ratio of the pixels representing the objects assumed to be commodities to all the pixels representing the state monitoring area as a commodity occupancy rate (ST1001).

Next, an average value of the commodity occupancy rates obtained up to now is calculated (ST1002). The commodity occupancy rate which is first obtained is directly used as the average value, and in the second (second state monitoring area) and subsequent cases, the average value of the commodity occupancy rates obtained up to the previous time is calculated as the average value.

Next, it is determined whether or not there is still another state monitoring area for which the display amount is not acquired (ST1003). If there is still another state monitoring area for which the display amount is not acquired (Yes in ST1003), the process of ST1001 and ST1002 is repeated with another state monitoring area as a target. When the display amount acquisition for all the state monitoring areas is completed (No in ST1003), the calculated average value is stored in the memory (ST1004).

Thereafter, display screen generator 38 generates a monitoring screen in which images of the display area are arranged and displays it on monitor 15 (ST817). In a case where the sales opportunity loss does not occur, a display image (mark image) representing a cause is not displayed on the image of one of the display areas.

Further, the average value of the commodity occupancy rate stored in ST1004 is used for determination as to whether or not the display amount is insufficient in ST808. In the present embodiment, a predetermined value which is set based on the average value is used as a threshold, and a case of being the threshold or less or being less than it is determined as display amount shortage. Thus, the values from the average value to a constant width can be a threshold value, or the average value can also be directly used as a threshold. Thus, since a value based on the average value of the display amounts (commodity occupancy rates) in the state where the opportunity loss does not occur is set as a threshold, a determination as to whether the display amount shortage is the cause of the opportunity loss can be more accurately made according to the actual statistical information.

Although the present invention has been described based on a specific embodiment, these embodiments are merely examples, and the present invention is not limited by these embodiments. In addition, all the constituent elements of a commodity monitoring device, a commodity monitoring system, and a commodity monitoring method according to the present invention described in the above embodiments are not necessarily indispensable, and can be selected as appropriate at least without departing from the scope of the present invention.

For example, in the present embodiment, a retail store such as a convenience store has been described as an example, but the present invention is not limited to such a retail store, but can also be applied to a store of a business type other than the retail store.

In the present embodiment, as illustrated in FIG. 2, an omnidirectional camera having a photographing range of 360 degrees using a fisheye lens is used as camera 1, but a camera having a predetermined angle of view, a so-called box camera may also be used.

Further, in the present embodiment, as illustrated in FIG. 7, rectangles are vertically arranged and displayed as a display image (mark image) representing an opportunity loss cause in the state monitoring area, but the display image (mark image) is not limited thereto, and for example, an icon representing the opportunity loss cause with a change of a pattern or color may be displayed on or near the image of the state area, or a color bar whose length and color change depending on the degree of cause may be displayed.

In the present embodiment, as illustrated in FIG. 6, statistical information on the number of visitors and the number of purchasing customers is displayed, but in addition thereto, statistical information on the number of customers staying in front of the display area (such as shelves) (the number of staying customers) may be displayed. In this way, it is possible to more reliably recognize the status of the sales opportunity loss. In this case, the number of customers per unit time may be acquired by counting the number of customers staying in front of the display area from the image of camera 1, using a known person detection technique.

Statistical information obtained by aggregating the commodity occupancy rate, the specific commodity occupancy rate, the number of commodity types, the front row commodity occupancy rate, and the face-up shortage rate which are sources for determining the opportunity loss cause, for each time, may be displayed.

In addition, in the present embodiment, three causes which are the display amount shortage, the commodity type number shortage, and the face-up shortage are detected as an opportunity loss cause, but only one or two causes may be detected.

In the present embodiment, PC 3 installed in the store may be configured to execute the processes required for the commodity monitoring, but as illustrated in FIG. 1, the required processes may be executed by PC 11 installed in the head office or cloud computer 21 constituting a cloud computing system. The required processes may be shared by a plurality of information processing devices, and information may be transferred between the plurality of information processing devices through a communication medium such as an internet protocol (IP) network or a local area network (LAN). In this case, a commodity monitoring system is configured with the plurality of information processing devices that share required processes.

With such a configuration, a device such as PC 3 installed in the store may be configured to execute at least a process having a large amount of data, for example, a commodity detection process, among the processes required for commodity monitoring. With this configuration, since the data amount of the remaining processing can be reduced, even if the remaining processing is executed by an information processing apparatus installed at a location different from the store, for example, PC 11 installed in the head office, the communication load can be reduced, so that the operation of a system using a wide area network connection form becomes easy.

Further, cloud computer 21 may execute all of the required processes, or cloud computer 21 may share at least a screen output process among the required processes. With this configuration, a mobile terminal such as smart phone 22 or tablet terminal 23 as well as PC 3 and 11 installed in the store and the head office can also display the monitoring screen, so that supervisors who are traveling through the store can monitor the cause of the opportunity loss at a remote store at any place such as a visiting place in addition to the store and the head office.

Further, in the present embodiment, a case is described in which PC 3 installed in the store executes a process required for commodity monitoring, a monitoring screen or the like is displayed on monitor 15 connected to PC 3, and required input and output are performed in PC 3. In addition thereto, required input and output may be performed in an information processing device different from the information processing device that executes a process required for commodity monitoring, for example, PC 11 installed in the head office, or mobile terminals such as smart phone 22 or tablet terminal 23.

Further, in the modification example of this embodiment, in a case where the opportunity loss does not occur, an average value is calculated by acquiring the display amount, and the value which is set based on the average value is a threshold used for determination of the display amount shortage, but similarly, in a case where the opportunity loss does not occur, an average value of the number of types is calculated by acquiring the number of types of commodities, and the value based on the average value of the number of types may be a threshold for determining the type number shortage. In a case where the opportunity loss does not occur, the average value of the front row commodity occupancy rate or the face-up shortage rate is calculated by acquiring face-up, and the value based on the average value of the front row commodity occupancy rate or the face-up shortage rate may be a threshold used for determining the face-up shortage. With this configuration, a determination whether or not each cause is the cause of an opportunity loss is made in consideration of the average value of the display amount, the number of types, and the face-up when the opportunity loss does not occur, it is possible to determine more accurately an opportunity loss cause.

INDUSTRIAL APPLICABILITY

In a commodity monitoring device, a commodity monitoring system and a commodity monitoring method according to the present invention, since a cause of a sales opportunity loss is analyzed from commodity shelves and a display image illustrating the cause is superimposed on a monitoring image of the display state of the commodity shelves, a store staff member can promptly recognize a commodity shelf at which there is the sales opportunity loss and the cause thereof. Thus, the present invention is useful as a commodity monitoring device, a commodity monitoring system and a commodity monitoring method which have an effect capable of preventing a sales opportunity loss, by a store staff member promptly implementing a commodity management work, and monitor a sales opportunity loss device, based on a captured image of a display area of a store.

REFERENCE MARKS IN THE DRAWINGS

1 camera
2 recorder
3, 11 PC
4 POS terminal
12 POS server
15 monitor
16 input device
21 cloud computer
22 smart phone
23 tablet terminal
30 image acquirer
31 sales information acquirer
32 visitor detector
33 measurer
331 visitor number acquirer
332 purchasing customer number acquirer
34 evaluator
35 statistical information generator
36 commodity detector
361 display amount acquirer
362 commodity type number acquirer
363 face-up acquirer
37 sales opportunity loss analyzer
38 display screen generator
39 operation input controller
40 state monitoring area setter
41 commodity setter
400 bus
401 CPU
402 RAM
403 ROM
404 network interface
405 VRAM
406 input controller
407 HDD
408 external storage device interface

The invention claimed is:

1. A commodity monitoring device which includes a processor, wherein the processor
    acquires a number of customers who visit a store, based at least on one or more images captured by at least one camera installed in the store;
    acquires a number of customers who purchase a commodity, from a sales information management device that manages sales information of the store;
    generates statistical information, based on a number of visitors and the number of purchasing customers;
    detects occurrence of a sales opportunity loss, based on the statistical information;
    detects a display amount of commodities when the occurrence of a sales opportunity loss is detected, based on a captured image of a display area in the store, the display amount of commodities determined by detecting a presence or absence of commodities in a front row and a rear row in the captured image of the display area, wherein rows in a front horizontal direction of a display shelf are set as horizontal rows, rows in a front vertical direction of the display shelf are set as vertical rows, a row on a front side of the display shelf, of the horizontal rows is set, as the front row, and a row on a rear side of the display shelf is set as the rear row;
    and analyzes a cause of the sales opportunity loss as a display amount shortage when the detected display amount of a commodity is less than or equal to an average value of a commodity occupancy rate; and
    generates and displays, a monitoring screen that communicates with the commodity monitoring device, in which a display image representing the cause of the sales opportunity loss is superimposed on the image of the display area, including at least one indicator representing a degree of severity of the sales opportunity loss.

2. The commodity monitoring device of claim 1, wherein the displayed commodities are detected, from images of an interior of a state monitoring area which is set as an area including displayed commodities, in captured images of the display area.

3. The commodity monitoring device of claim 1, wherein the displayed commodities are detected by detecting a commodity that matches a pre-stored commodity image, of the captured images, and when there is a commodity that matches the commodity image, counts the number of types of commodities as a single type.

4. The commodity monitoring device of claim 1, wherein the displayed commodities are detected based on an occupancy rate of a commodity that matches the pre-stored commodity image, of the captured image.

5. The commodity monitoring device of claim 1, wherein the commodity occupancy rate is based upon an area which is set as a front row of the display shelf, in the captured image.

6. The commodity monitoring device of claim 1, wherein the detected sales opportunity loss is based on an analysis of the cause of the sales opportunity loss as a face-up shortage when a face-up shortage rate is a predetermined value or more than the predetermined value, the face-up shortage rate being obtained from the number of vertical rows in which commodities are in the rear rows and the number of vertical rows in which there is no commodity in front rows and commodities are in rear rows, based on the detection result.

7. The commodity monitoring device of claim 1, wherein the detected sales opportunity loss, is detected is based upon an analysis of the cause of the sales opportunity loss as a type number shortage, when the number of types of displayed commodities is the predetermined number or less than the predetermined number, based on the detection result.

8. The commodity monitoring device of claim 1, wherein the detected sales opportunity loss is based upon an analysis of the cause of the sales opportunity loss as a face-up shortage, when the display amount of commodities displayed in the front row of the display shelf is the predetermined amount or less than the predetermined amount, based on the detection result.

9. The commodity monitoring device according to claim 1, wherein the processor:
further generates the monitoring screen in which mark images that are color-coded for each cause of the sales opportunity loss are superimposed on the image of the display area and displayed in a vicinity of an edge of each image included in the display area.

10. The commodity monitoring device of claim 1, wherein the processor further generates a monitoring screen in which a display image representing the cause of the sales opportunity loss is superimposed on the image of a display area such that a degree is able to be determined from mild to severe.

11. The commodity monitoring device of claim 1, wherein the processor further displays statistical information along a time axis, and
generates a monitoring screen in which a display image representing the cause of the sales opportunity loss in the corresponding time is superimposed on the image of the display area corresponding to the selected time on the time axis.

12. A commodity monitoring system which monitors a sales opportunity loss based on a number of visitors to a store, a number of purchasing customers in the store, and captured images of a display area of a commodity, the system comprising:
a camera that captures an image of the display area; and
an
information processing device,
wherein the information processing device includes a processor, wherein the processor
acquires the number of customers who visit a store based upon the captured image;
acquires the number of customers who purchase a commodity, from a sales information management device that manages sales information of the store;
generates statistical information based on the number of visitors and the number of purchasing customers;
detects occurrence of a sales opportunity loss based on the statistical information; when
the occurrence of a sales opportunity loss is detected, detects displayed commodities based on the captured image of the display area in the store, the displayed amount of commodities determined by detecting a presence or absence of commodities in a front row and a rear row in the captured image of the display area, wherein rows in a front horizontal direction of a display shelf are set as horizontal rows, rows in a front vertical direction of the display shelf are set as vertical rows, a row on a front side of the display shelf, of the horizontal rows is set, as the front row, and a row on a rear side of the display shelf is set as the rear row;
analyzes a cause of the sales opportunity loss as a display amount shortage when the detected displayed amount of a commodity is less than or equal to an average value of a commodity occupancy rate;
generates and displays a monitoring screen that communicates with a commodity monitoring device in which a display image representing the cause of the sales opportunity loss is superimposed on the image of the display area, including at least one indicator representing a degree of severity of the sales opportunity loss.

13. A commodity monitoring method comprising:
causing an information processing device, which includes a processor, to
monitor a sales opportunity loss based on a number of visitors to a store, based at least on one or more images captured by at least one camera installed in the store, a number of purchasing customers in the store, and captured images of a display area of a commodity,
acquire the number of visitors to a store,
acquire the number of purchasing customers who purchase a commodity, from a sales information management device that manages sales information of the store;
generate statistical information based on the number of visitors and the number of purchasing customers;
detect occurrence of a sales opportunity loss based on the statistical information;
detect a displayed amount of commodities based on the captured image of the display area in the store, when the occurrence of a sales opportunity loss is detected, the displayed amount of commodities determined by detecting a presence or absence of commodities in a front row and a rear row in the captured image of the display area, wherein rows in a front horizontal direction of a display shelf are set as horizontal rows, rows in a front vertical direction of the display shelf are set as vertical rows a row on a front side of the display shelf, of the horizontal rows is set, as the front row, and a row on a rear side of the display shelf is set as the rear row, analyzing a cause of the sales opportunity loss as a display amount shortage when the detected displayed amount of a commodity is less than or equal to an average value of a commodity occupancy rate; and generate and display a monitoring screen that communicates with a commodity monitoring device, in which a display image representing the analyzed cause of the sales opportunity loss is superimposed on the image of the display area, including at least one indicator representing a degree of severity of the sales opportunity loss.

14. The commodity monitoring device of claim 1, wherein the processor further detects occurrence of a sales opportunity loss based on a result of comparing a difference between the number of visitors and the number of purchasing customers with a predetermined value.

* * * * *